April 30, 1946.　　　E. M. O'NEILL　　　2,399,291
LIQUID LEVEL INDICATOR
Filed Aug. 8, 1942　　　2 Sheets-Sheet 1
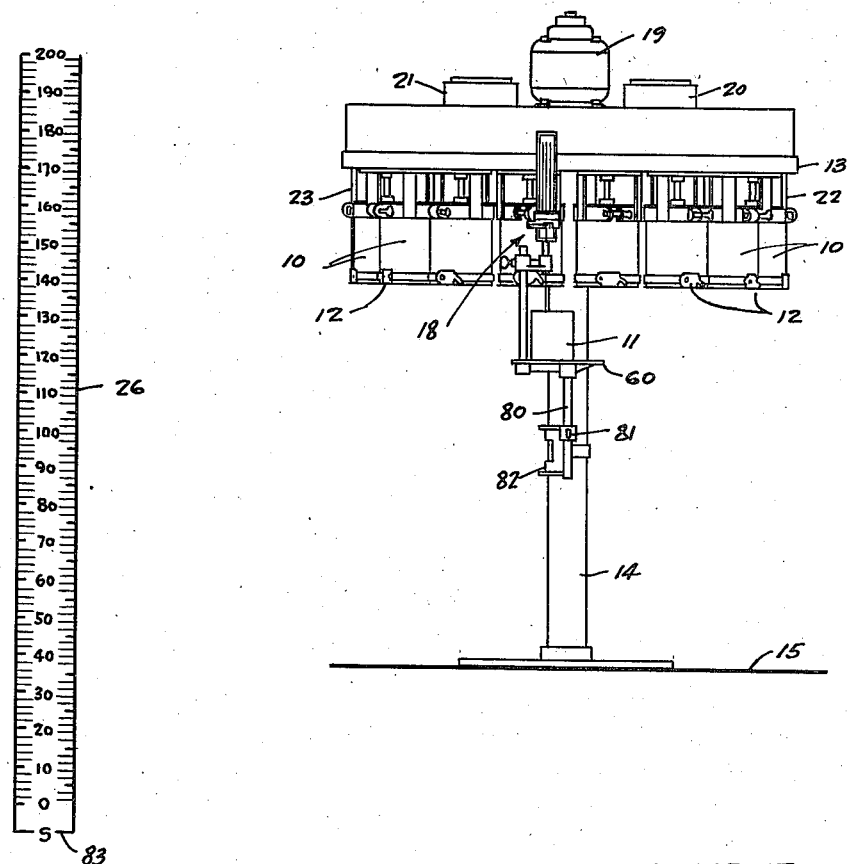
INVENTOR
Edward M. O'Neill
BY John Flann
ATTORNEY April 30, 1946. E. M. O'NEILL 2,399,291
LIQUID LEVEL INDICATOR
Filed Aug. 8, 1942 2 Sheets-Sheet 2
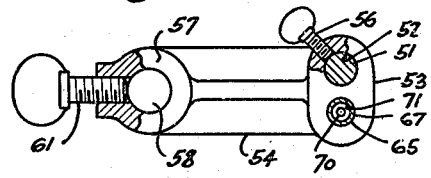
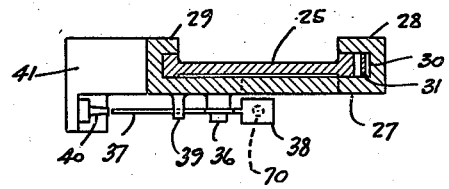
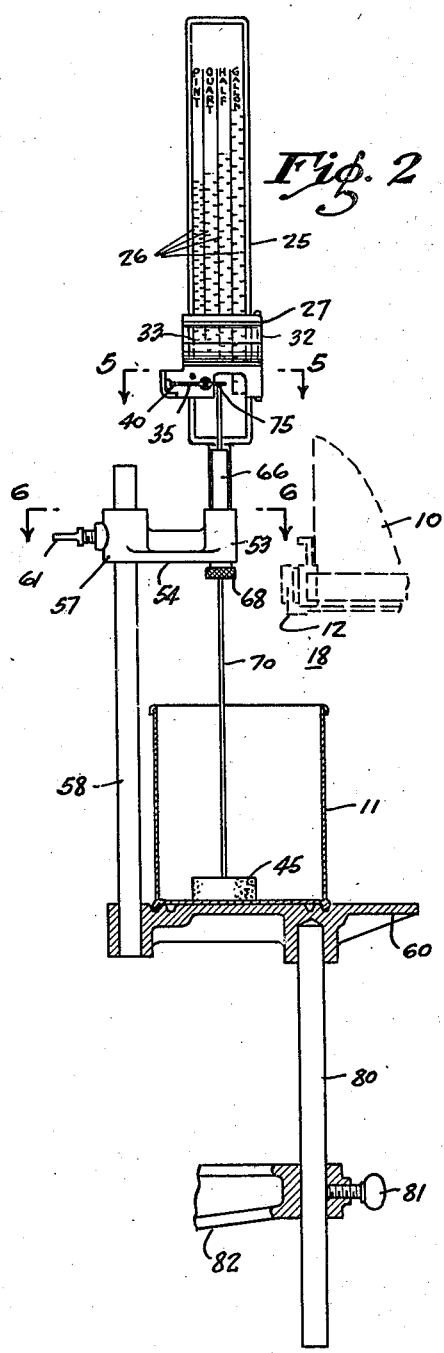
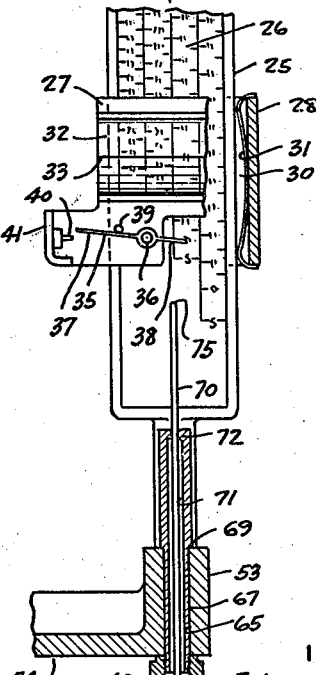
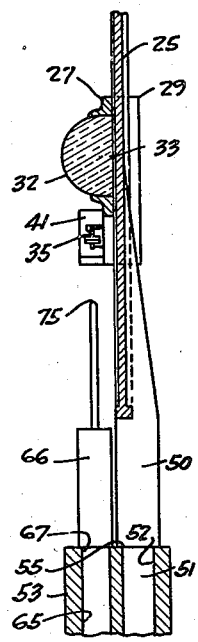
INVENTOR
Edward M. O'Neill
BY John Flam
ATTORNEY Patented Apr. 30, 1946

2,399,291

UNITED STATES PATENT OFFICE 2,399,291

LIQUID LEVEL INDICATOR

Edward M. O'Neill, San Francisco, Calif., assignor to Union Machine Company, San Francisco, Calif., a corporation of California Application August 8, 1942, Serial No. 454,087

4 Claims. (Cl. 73—322)

This invention relates to a gauge; more particularly it relates to apparatus for accurately indicating when, during the operation of pouring or placing liquid in a container, a predetermined quantity or proportion has been added.

An object of this invention is the provision of a gauge which will accurately indicate small changes in a liquid level over a considerable range.

In mixing paints for matching colors, such as for automobile bodies, it is very important to employ a great deal of accuracy in conformity with a prescribed formula, giving the proportions of each paint ingredient. Thus if there are a number of basic colors or ingredients to choose from, the formula may take the form of prescribing the numbers associated with the respective ingredient colors, and the number of units of volume to be added of each. The unit of volume may be arbitrary, and in fact, as hereinafter described, the unit is arbitrarily chosen as one two-hundredth of the volume of a paint can. It is another object of this invention, therefore, to provide a simple method and apparatus for compounding such paint prescriptions or formulas.

It is still another object of this invention to provide a simple and inexpensive gauging apparatus capable of giving a positive and readily discernible indication of a definite quantity of liquid in a container.

It is a still further object of this invention to provide gauging apparatus for use in preparing a definite quantity of a desired tint by mixing accurate proportions of appropriate colors.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

In the drawings:

Figure 1 is a view of a mixing machine incorporating the gauging apparatus;

Fig. 2 is an elevation, partly in section, on an enlarged scale, of the gauging apparatus;

Fig. 3 is a fragmentary view, partly in section, of the gauge;

Fig. 4 is a section as seen on plane 4—4 of Fig. 3;

Figs. 5 and 6 are detail sections as seen on correspondingly numbered planes of Fig. 2; and Fig. 7 is a detail of indicia which may be used with the gauge.

A mixing apparatus (Fig. 1) is shown of the type disclosed in a copending application filed in the name of Edward M. O'Neill, on August 24, 1942, Serial No. 455,833 and entitled "Mixing apparatus." This apparatus includes a plurality of cans or containers 10. These contain different liquids or ingredients which may be required in a mixture formula. For instance, cans 10 may each contain paint, lacquer or the like, of a different color. It is thus possible to produce a paint or lacquer mixture that produces a desired tint or shade of color, by mixing portions of some or all of these paints in cans 10 in accordance with a known formula.

For receiving the ingredients, a receptacle 11 is provided. It is suitably supported below cans 10. Each of cans 10 is provided with a valve 12 for accurately controlling the discharge of the contents of the can. Cans 10 are carried by a table structure 13, rotatably supported on a standard 14 which may rest on the floor 15. The arrangement is such that table 13 may be manually revolved to bring that can 10 having the desired ingredient, immediately over receptacle 11. The valve 12 of this can is then opened to allow proper quantity of paint to flow into receptacle 11, this quantity being indicated by the gauging apparatus 18, in a manner to be hereinafter described.

Means including motor 19 are provided for agitating the paint or lacquer in cans 10 before the mixing operation is started. Containers 20, 21 are provided on table 13 for holding liquids which flow more readily than paint and do not require agitation, such as a "thinner" or "dryer." Liquid from the respective containers 20, 21 is discharged through valved pipes 22, 23 which are each placed between a pair of cans 10 and terminate adjacent the bottoms of these cans.

The gauging apparatus 18 includes a float 45 and its stem 70 (Figs. 2, 3 and 4). This float is intended to be freely movable in accordance with the level of the liquid in the can 11, so that the upper end 75 of the float stem 70 will truly correspond to the liquid level. In order to ensure accuracy, the float 45 is made from very light material, such as balsa wood; and the stem 70 may be in the form of a very thin aluminum tube.

A scale member 25 is utilized, to make it possible to gauge the rise of the float 45, in proportion to the height of the can 11. This member is adjustably supported above the receptacle 11. Scale member 25 is shown as carrying a plurality of scales 26, each having indicia for use with receptacles 11 of different sizes. Thus there are four scales 26 shown; the shortest one, on the left of member 25, being intended for example for use with a pint receptacle, and the longest one, on the right being intended for use with a gallon receptacle, the intermediate scales 26 being respectively for a quart and a half gallon.

An example of one of the scales 26 is illustrated in Fig. 7. There are two hundred scale divisions, vertically arranged, and uniformly spaced. In order to increase the spacing of the division marks, the graduations alternate between the left and right hand edges of the scale. The rise of float 45 by one scale division thus corresponds to an increase in the liquid contents of one two-hundredth of the entire can volume. The total length of the scale 26 thus corresponds to the height of the can 11. Since the pint, quart, two quart and gallon cans are of progressively greater height, the scales 26, as heretofore stated, are of corresponding lengths.

An index member 27 is used for assisting in determining when the float 45 rises to correspond to a definite scale division. It is slidable along scale member 25 and is held thereon by flanges 28, 29 (Fig. 5) which embrace the edges of member 25. The right hand edge of member 27 is arranged to provide a space 30 for the accommodation of an arcuate spring 31. This spring serves to frictionally secure member 27 in adjusted position on scale member 25.

To assist in accurately positioning member 27, this member carries a cylindrical magnifying lens 32 through which the scales 26 are visible. Lens 32 has an index line or hair line 33 scribed on its inner surface and adapted to register with the indicia of scales 26.

Below lens 32, a pointer 35 is pivoted at 36 on member 27. Pivot 36 is offset from the center of pointer 35, forming a long indicating portion 37 and a short actuating portion 38. The actuating portion 38 is made sufficiently heavy to overbalance the indicating portion 37, whereby with the indicating portion 37 extending to the left, as in Fig. 3, pointer 35 will turn clockwise about its pivot 36. This movement is checked by stop pin 39 on member 27.

As a means of indicating a definite position of pointer 35, a stationary index 40 is mounted on an extension 41 of member 27, for cooperation with pointer 35. It will be apparent that a barely perceptible movement of the actuating end 38 of pointer 35 will result in a substantial and readily observable movement of the indicating end 37 with respect to fixed point 40. Such movement occurs with a change in the liquid level or quantity under consideration. In the present instance, such movement is provided by the float 45, disposed in receptacle 11 so as to float on the surface of any liquid therein.

Scale member 25 has a downward extension 50 with a reduced cylindrical portion 51 accommodated in a bore 52 of boss 53 at one end of a supporting arm or bracket 54. Scale member 25 is supported in bracket 54 as by shoulder 55 and is secured against rotation therein by a set screw 56 (Fig. 6). A boss 57 at the opposite end of bracket 54 is slidable axially as well as angularly on a rod 58, which is in turn fixed to a small platen or table 60 supporting the receptacle 11. Bracket 54 is secured in adjusted position on rod 58 by a set screw 61 tapped in boss 57. It will be apparent that by loosening set screw 61, the distance of scale member 25 above table 60 and receptacle 11 may be adjusted; also that the position of scale member 25 with respect to receptacle 11 may be altered transversely.

Hub 53 of bracket 54 has a bore 65 parallel with and spaced from bore 52. A tubular member 66 has a reduced portion 67 secured in this bore 65, as by a knurled nut 68 threaded on the lower end of portion 67. This nut 68 engages the lower face of hub 53 and clamps shoulder 69 of member 66 against the upper face of hub 53.

The upwardly extending float rod or stem 70 is slidable through a clearance bore 71 in member 66. The upper end of bore 71 is reduced in diameter as at 72 to closely embrace rod 72, and nut 68 is similarly arranged at its lower face as at 73, to closely embrace rod 70. These embracing surfaces are rounded to ensure that rod 70 may slide freely. Thus, rod 70 is accurately guided for vertical movement, at the same time it can move freely through its guide 66.

By inspection of Figs. 3, 4 and 5, it will be apparent that rod 70 extends directly below the actuating portion 38 of pointer 35, and that by sufficient upward movement of float 45 and rod 70, the upper end 75 of rod 70 will contact operating portion 38 of pointer 35 and swing the pointer counterclockwise bringing the indicating end 37 opposite stationary pointer 40. By adjusting member 27 along scale member 25, the height of pointer 35 is correspondingly adjusted. Accordingly the amount of upward movement required of float 45 before actuating the pointer 35 will be varied; and the quantity of liquid added to receptacle 11 before an indication is given will be altered.

Table 60 is mounted on a post 80 which is adjustably secured as by a set screw 81 in an arm 82 clamped to pedestal 14. In this manner receptacle 11 may be suitably positioned with respect to containers 10 to receive paint therefrom without splashing or spilling.

In using the gauging apparatus, a preliminary adjustment must be made to bring the scale 26 corresponding to the can size, to the proper height for accurate cooperation with the float mechanism. First, member 27 is positioned so that index 33 coincides with zero on the appropriate scale 26, while supporting float 45 on the bottom of receptacle 11, and then adjusting bracket 54 with scale member 25, up or down, until rod 70 causes pointer 35 to aline with stationary pointer 40, as indicated in Fig. 2. Now the float stem 70 obviously correctly indicates by pointer 35 that the can 11 has zero filling.

Now member 27 is moved upward to bring index 33 into line with the desired quantity indication on the chosen scale 26. Such movement of course causes pointer 35 immediately to return to the position of Fig. 3, that is against stop pin 39. Liquid is then gradually poured into receptacle 11, raising float 45, until rod 70 again contacts end 38 of pointer 35, when further addition of liquid swings pointer 35 towards alinement with pointer 40. Due to the multiplication of travel between the float 45 and the indicating end 37 of pointer 35, a very sensitive indication of the changing liquid level is obtained, and by stopping the addition of liquid to the receptacle 11 when pointers 35 and 40 are in alinement, a very accurate indicating of the liquid level is obtained.

However, due to inequalities that may sometimes occur in the bottom of receptacle 11, the position of rest of the float 45 on the bottom may be quite haphazard. In proportioning colors to reproduce an exact tint, the resultant inaccuracy in the quantity of the first color may be fatal. To obviate such inaccuracy, provisions are made to form an accurately level gauging surface in the can bottom. As shown in Fig. 7, each of the scales 26 has a mark "S" indicated by 83 a short distance below the zero mark, and the index 33 is alined with this mark 83 in the initial positioning of the scale 25 with float 45 on the bottom of the empty receptacle 11. There is no need for accuracy in this setting, as will appear. The index 33 is then moved up to the zero mark and sufficient liquid of a character which will not adversely affect the desired qualities of the mixture is then added to receptacle 11 to aline pointers 35, 40, giving an accurate zero indication.

After the first measured quantity of an ingredient is thus poured into can 11, the formula prescribes that index 33 be moved to a higher scale division, and pouring the second ingredient into the same can 11, until pointer 35 is alined with index 40. The same procedure is used for succeeding ingredients.

As an example, such a formula, utilizing in this case only four ingredients out of the fifteen provided, may read as follows:

| | |
|---|---|
| No. 1 | 151 |
| No. 2 | 166 |
| No. 6 | 167½ |
| No. 15 | 200 |

To comply with such a formula, that can 10 which carries ingredient No. 1 is brought over can 11 by appropriate rotation of table 13. Then after preliminary setting of the apparatus as heretofore described, the hair line index 33 is moved to scale division 151 on that scale 26 which corresponds to the size of can 11. The ingredient No. 1 from the proper can 10 is then poured into can 11 until the pointer 35 is alined with index 40. Now the hair line index 33 is moved up to division 166, and ingredient No. 2 from appropriate can 10 is poured into can 11 until the pointer 35 is again alined with index 40. Then hair line index 33 is moved up to a position midway between divisions 167 and 168, and can 10, corresponding to ingredient 6, is used as a source of supply until pointer 35 again alines with index 40. Lastly, hair line index 33 is moved to division 200, and ingredient No. 15 is poured into can 11 until the pointer 35 again alines with index 40. Can 11 is now full, and can be used for reproducing the color represented by the formula.

Obviously, the formula can be translated into percentage form, by taking account of the fact that the scale divisions are spaced apart by the equivalent of one-half of one percent of the total mixture, and that the differences in the successive scale readings correspond to multiples of this unit. The formula can thus be written as follows:

| | Per cent |
|---|---|
| No. 1 | 75.50 |
| No. 2 | 7.50 |
| No. 6 | .75 |
| No. 15 | 16.25 |
| Total | 100.00 |

The scales 26 thus merely form convenient indices of the volume percentages based upon the assumption that the can 11 has a uniform cross section.

The liquid added to bring the float to zero may advantageously be a paint thinner or drier supplied from containers 20, 21. This thinner or drier not only serves to establish a uniform zero level in can 11, but since it remains on top of the colored pigments, due to its lower specific gravity, it maintains float 45 out of contact with these colors and prevents it being soiled thereby. Thus, at the conclusion of the mixture forming operation, the thinner with the float 45 suspended therein is on top of the mixture, allowing the float 45 to be removed and readily wiped dry without the necessity of cleaning.

What is claimed is:

1. In a float gauge mechansim, a scale carrying member, means forming an adjustable index cooperating with the scale, a freely movable pointer carried by said index forming means, and a float structure for actuating the pointer when a definite vertical position of the float is reached, said index indicating the quantity necessary to move the pointer to indicating position.

2. In a liquid gauge, a scale, a member adjustable with respect to the scale and carrying an index cooperating with the scale, a pointer pivoted on said member, a fixed pointer mounted on said member and adapted to register with the pivoted pointer for giving an indication, a float, and means whereby movement of the float operates the pivoted pointer, the quantity of liquid necessary to move the pointer to indicating position being indicated by the index.

3. In a liquid gauge, a scale member having a series of graduations thereon; means adjustable with respect to the scale and providing an index for co-operating with the graduations; means for maintaining said adjustable means in any set position corresponding to the desired quantity of liquid to be measured; an indicator mechanism carried by said adjustable means, said indicator mechanism including a movable pointer and a mark with which the pointer can co-operate; and a float structure for causing said pointer to move into co-operative relation with said mark.

4. In a liquid gauge, a scale member having a series of graduations thereon; means adjustable with respect to the scale member and providing an index for co-operating with the graduations; an indicator mechanism carried by said adjustable means, said mechanism including a movable pointer and a mark with which said pointer can cooperate; and means, responsive to changes in liquid level, for causing said pointer to move into cooperative relation with said mark when the said liquid level reaches a position corresponding to the adjusted position of said index.

EDWARD M. O'NEILL.